Jan. 31, 1956   F. L. MURPHY ET AL   2,732,814
RAILWAY VEHICLE
Original Filed Sept. 27, 1945   5 Sheets-Sheet 1
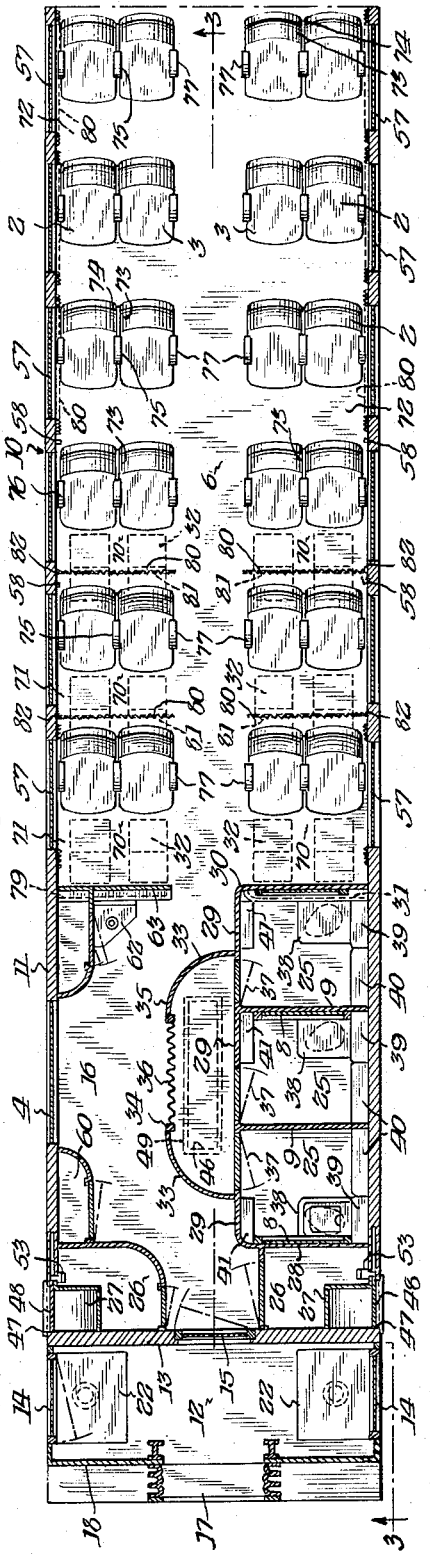
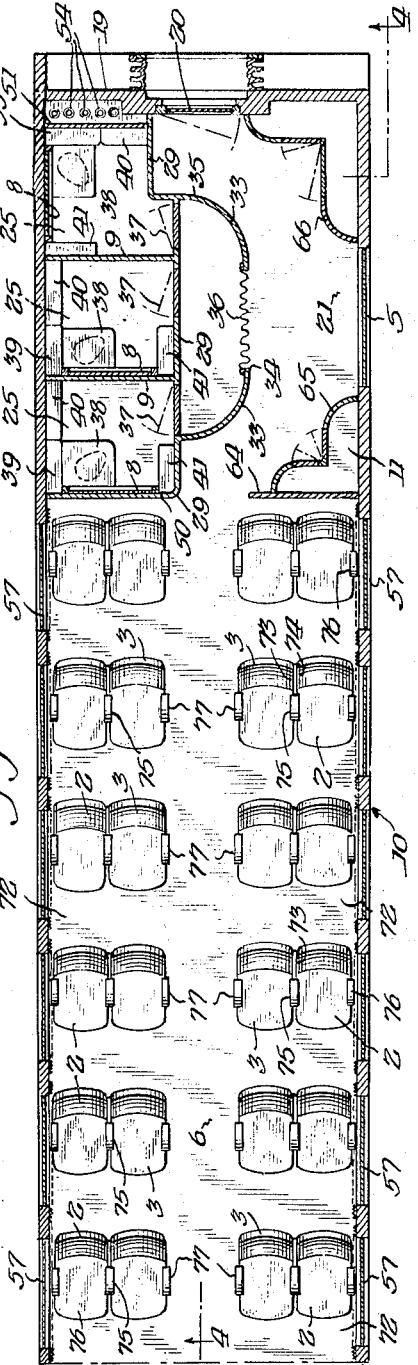
Inventors.
Frank L. Murphy,
Ralph W. Haman, &
Stanley W. Kay.
By Wayne Morris Russell
Atty.

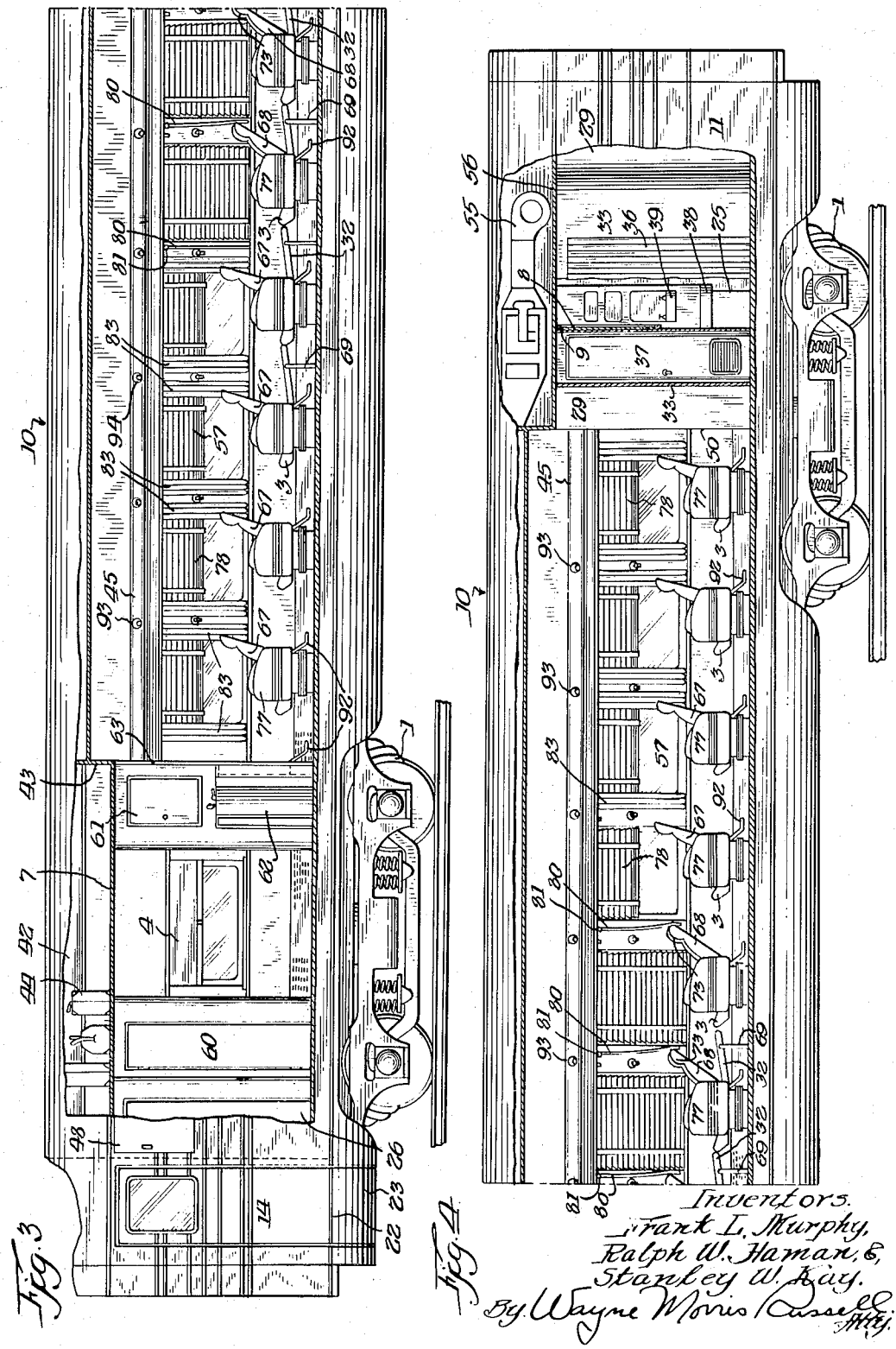

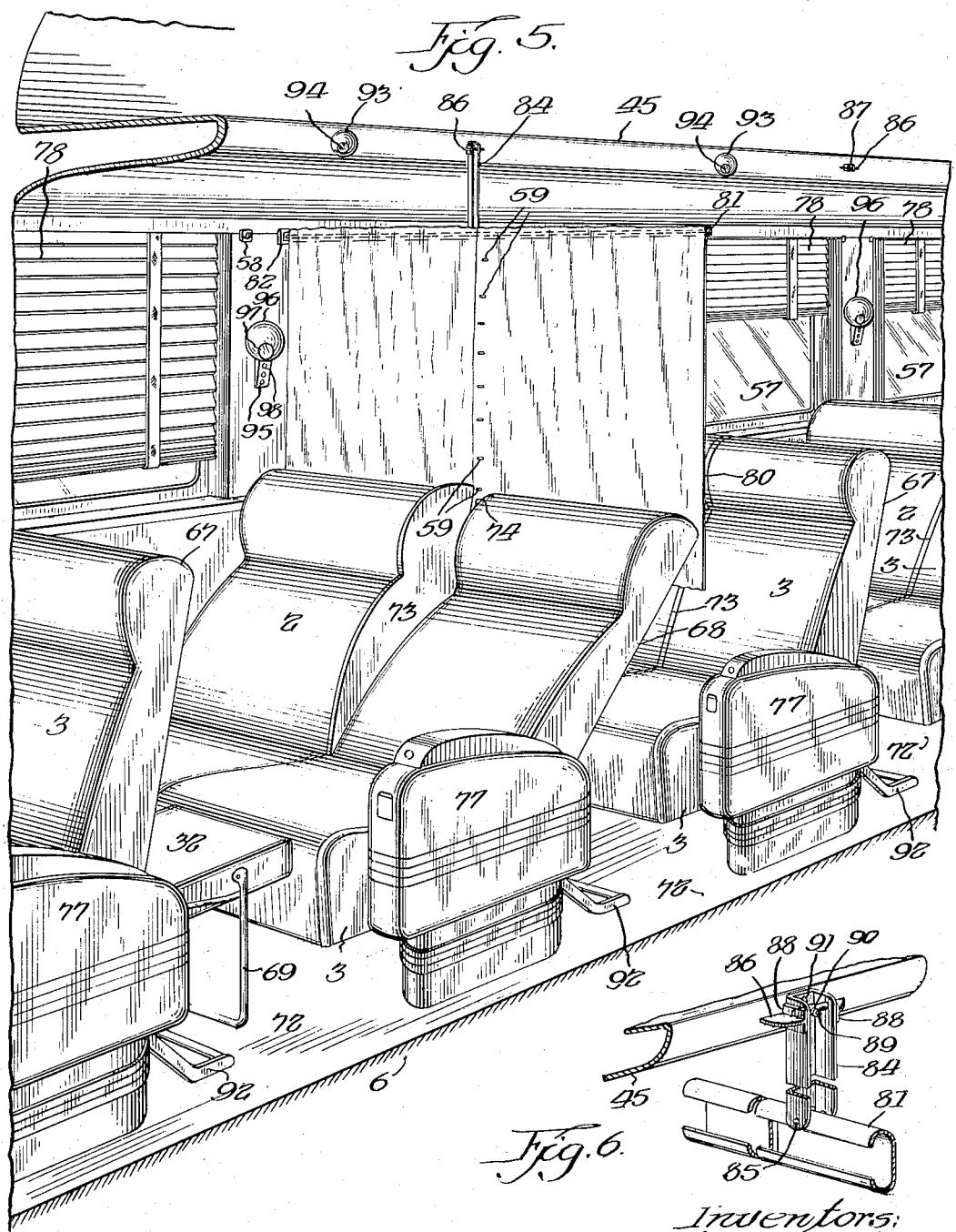

Jan. 31, 1956 F. L. MURPHY ET AL 2,732,814
RAILWAY VEHICLE
Original Filed Sept. 27, 1945 5 Sheets-Sheet 4
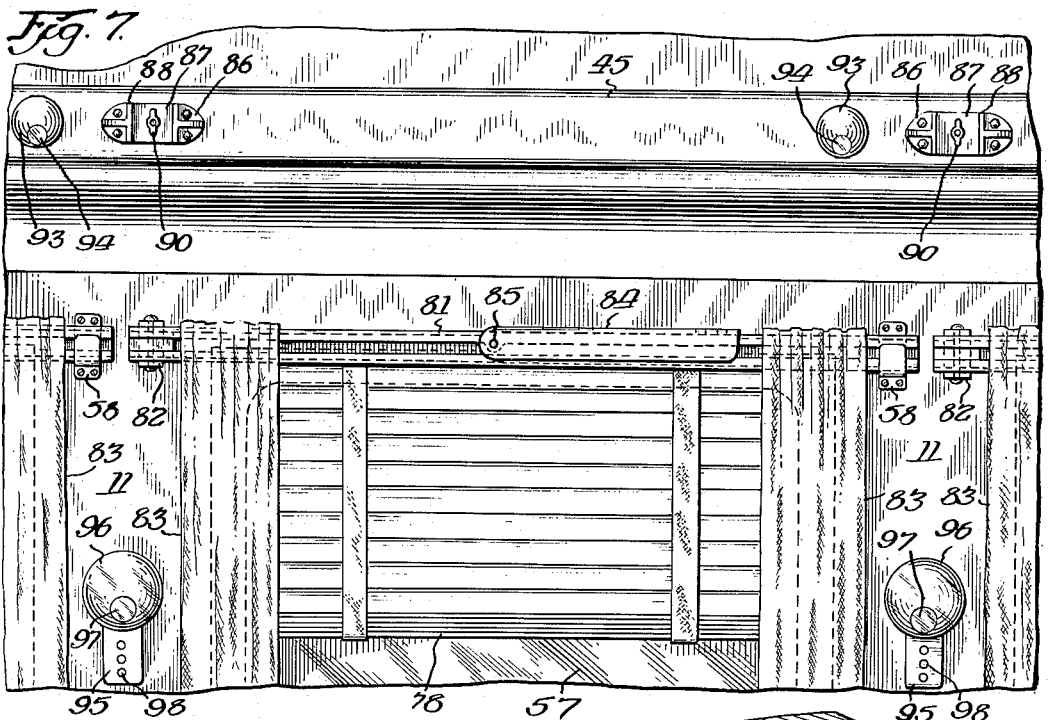
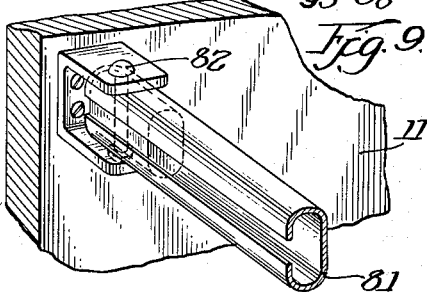
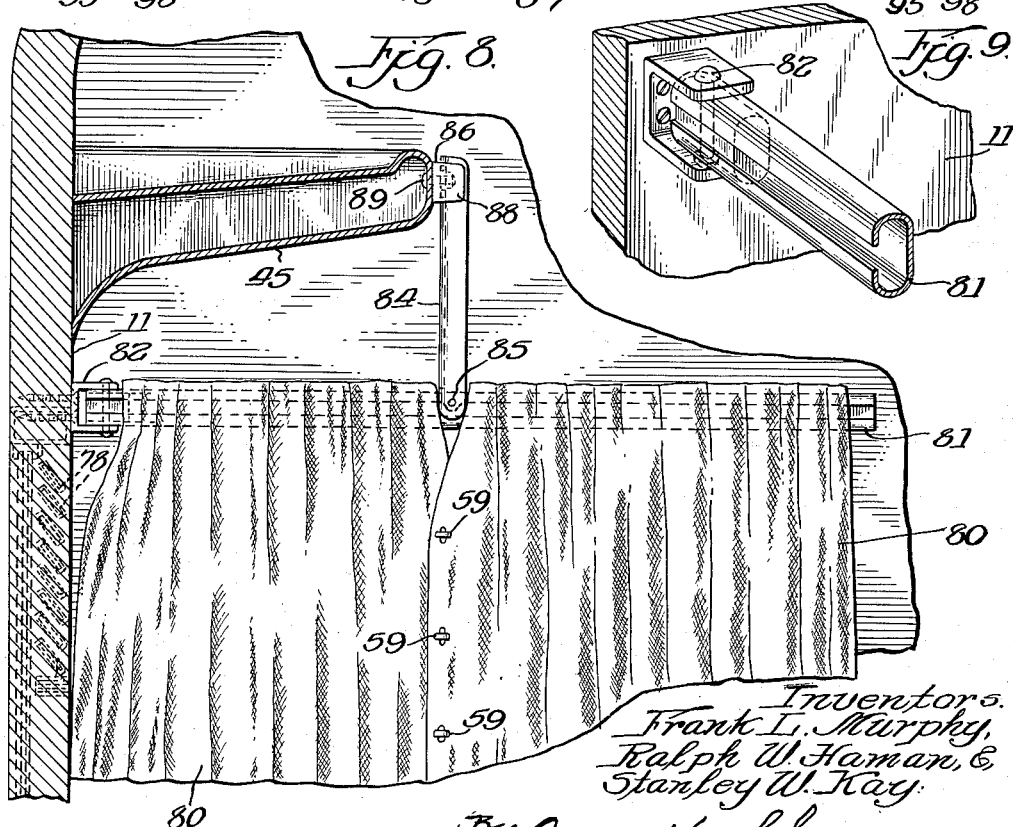
Inventors.
Frank L. Murphy,
Ralph W. Haman, &
Stanley W. Kay
By Oscar Hochberg. Atty.

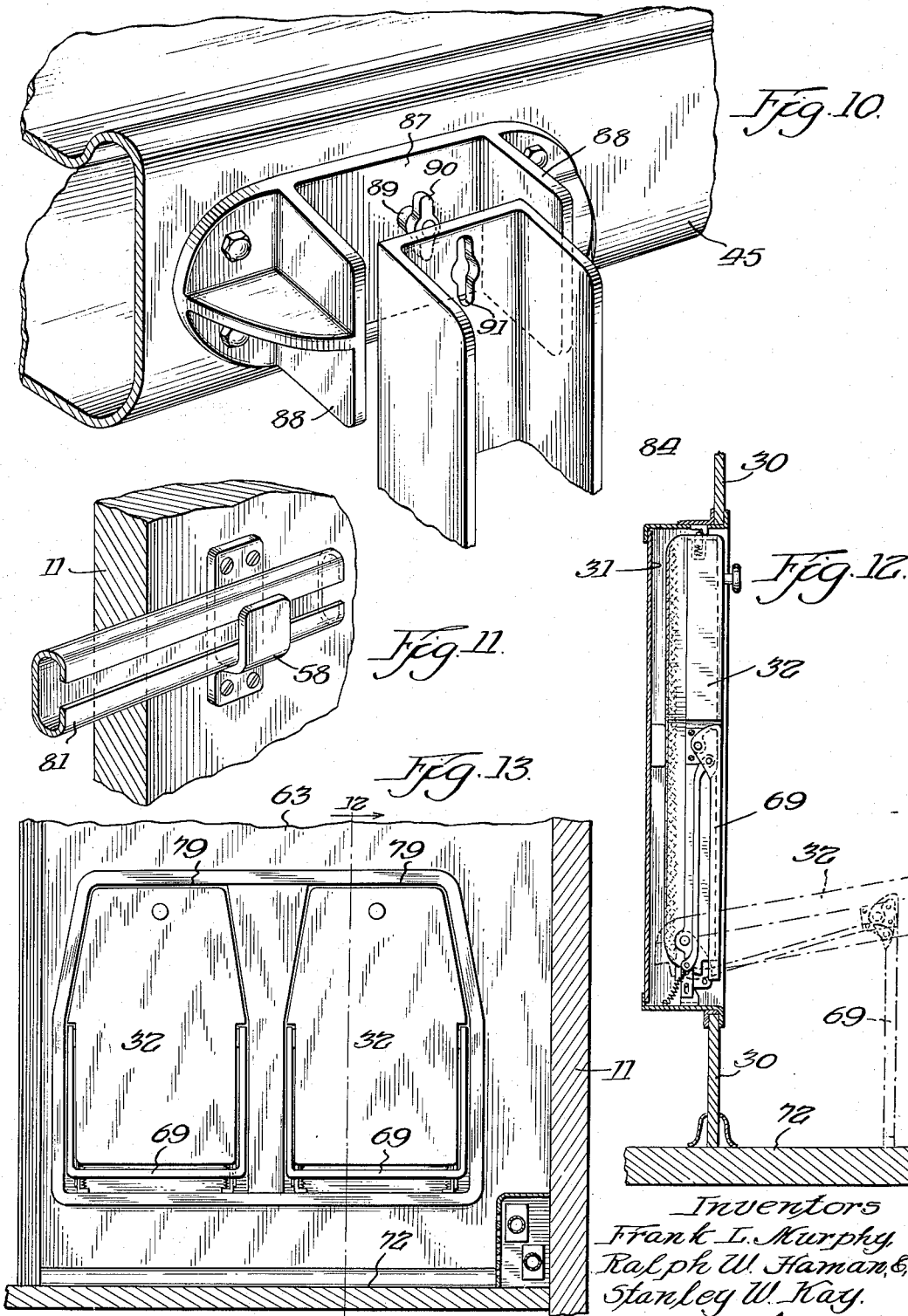

United States Patent Office 2,732,814
Patented Jan. 31, 1956

2,732,814

RAILWAY VEHICLE

Frank L. Murphy, Chicago, Ralph W. Haman, Flossmoor, and Stanley W. Kay, Chicago, Ill., assignors to Pullman-Standard Car Manufacturing Company, Chicago, Ill., a corporation of Delaware Original application September 27, 1945, Serial No. 618,948, now Patent No. 2,621,612, dated December 16, 1952. Divided and this application December 16, 1950, Serial No. 201,104

8 Claims. (Cl. 105—324)

This invention relates to passenger vehicles for use in high speed train service designed to increase the travel range of rail coach equipment and to provide comforts and conveniences heretofore available only to passengers in Pullman cars.

The principal object is to provide a rail vehicle having suitable means for dividing rows of seats upon opposite sides of a longitudinal aisle into seat sections and the several sections arranged with individual passenger spaces affording advantages hereinafter noted.

An important object is to provide rail coach passengers with seat section accommodations suitable for day and night travel with means to insure ample space and a measure of privacy for passengers desiring relaxation or repose without disturbing occupants of adjoining seat sections or encroaching upon companion seat space, with adequate provision for lighting controllable by the individual occupants of the seat sections.

A more specific object is to provide a seat section including an adjustable seat, a separating partition at one side of the seat, and adjustable curtains in front and in back of the seat to effect a virtual comparting of the section.

The invention further contemplates the provision of baggage handling and storage facilities to permit speedy loading and unloading of luggage at terminal points and intermediate stations to avoid interference with movement of passengers at vestibule platforms.

The foregoing and other objects and advantages of the invention will appear from the following description taken in connection with the accompanying drawings, in which—

Figs. 1 and 2 are complemental views in plan of the forward and rear half portions of the railway coach vehicle of this invention, illustrating, respectively, the vestibule end of the car with individual dressing rooms and overhead luggage handling facilities, and at the opposite end of the car a similar arrangement of individual dressing rooms with common anteroom between adjacent passageway and the dressing rooms, with both views depicting the intermediate seating arrangement upon opposite sides of the longitudinal aisle;

Figs. 3 and 4 are complemental vertical sectional views taken respectively on line 3—3, of Fig. 1, and showing the vestibule end of the car with adjacent overhead luggage storage compartment and side wall window and locker arrangement at contiguous passageway with drinking fountain, and line 4—4, of Fig. 2, looking in the direction indicated by the arrows, illustrating the dressing and anteroom arrangement at the opposite end of the car showing a portion of the anteroom wall at the passageway removed to expose the entrance door to one of the dressing rooms with portion of the wall of adjacent dressing room broken away to show toilet equipment installation therein, both views illustrating certain of the seats adjusted to an angle suitable for reclining purposes;

Fig. 5 is a vertical sectional view in fragmentary perspective showing the section curtains moved outwardly from the side wall to a position between chairs of adjoining sections to screen the space from contiguous sections with means for supporting the curtains from respectively adjacent overhead luggage racks at points away from the car side. This view shows also some of the chairs adjusted to a reclining position and fitted with retractible screens between companion chair backs, the foot and leg rests in one of the sections being shown in extended position for use;

Fig. 6 shows relation of baggage rack and curtain rod with rod locking and supporting mechanism on rod and rack;

Fig. 7 is a front elevational view of the curtain mounting and locking arrangement at the side wall position when used as drapes for the windows;

Fig. 8 is a vertical cross sectional view through the baggage rack at approximately the position indicated in Fig. 5, showing in larger detail the means for pivotally mounting the curtain rod at the side wall, and the rod-supporting clip, shown folded upon the rod in Fig. 7, in its open rod-supporting position in locked engagement with the supporting bracket on the baggage rack;

Fig. 9 is a close-up view in perspective of the hinge bracket for the curtain rod secured to the side wall and means for pivoting the curtain rod to the bracket;

Fig. 10 is a perspective view of the curtain rod-supporting and locking bracket on the baggage rack with the rod-supporting clip about to engage the locking means on the bracket;

Fig. 11 is also a perspective view of the free end of the curtain rod supported in locked position at the car side by a bracket secured to the side wall when the curtains function as drapes at the window position;

Fig. 12 is a vertical sectional view through the foot and leg rest pocket in the transverse walls at the front end of the rows of seats on opposite sides of the aisle, taken on the line 12—12, of Fig. 13, and looking in the direction indicated by the arrows; and Fig. 13 is a front elevational view of the same showing the foot and leg rests folded out of the way within the wall recesses and their respective supporting strut linkages in collapsed position within said pockets.

This application is a division of copending application Serial No. 618,948, filed September 27, 1945, for Railway Vehicle, now Patent No. 2,621,612, dated December 16, 1952.

In the drawings, 10 indicates the car as a whole supported on trucks 1, 11 the car sides, 12 the vestibule end with the body end wall 13, and 14 the vestibule side doors. The end door 15 opens to the vestibule 12 and adjacent inner passageway 16, and the opening 17 in the vestibule end wall 18 gives access to the connected cars of the train. At the opposite or non-vestibule end, the body end wall 19 is provided with a door 20 giving access to adjacent inner passageway 21 or to the next car in the train. Vestibule 12 is fitted with suitable trap doors 22 and steps 23 to permit entrance to or exit from the car. Between the body end walls or bulkheads 18 and 19 the car interior is divided into a central seating compartment 24 with dressing room and toilet sections at opposite ends thereof. The toilet and dressing rooms 25 at the vestibule end of the car are separated from the adjacent end wall 13 by supply lockers 26 and luggage chute installations 27, the rooms being enclosed in group formation by transverse housing end walls 28, longitudinal wall 29, and transverse end wall portion 30 separating the seating compartment 24 from rooms 25. In the present embodiment, the housing end wall 30 is recessed as at 31, to accommodate foot and leg rest elements 32 forming part of the seating installation hereinafter to be described.

Access to each group of rooms 25 is had from an adjacent anteroom 35 common to the respective group and defined by curved wall portions 33 spaced apart to provide an entrance 34 fitted with a curtain 36 to separate the anteroom space from the adjacent passageway 16 to afford a convenient enclosure for passengers desiring to wait for a dressing room to be vacated. The individual dressing rooms 25 are provided each with an entrance door 37 opening inwardly and which may be locked to insure privacy to the occupant. The rooms are equipped with a toilet hopper 38, a folding washstand 39, and ample lighting and comfort facilities such as shelving 40 for depositing a hand bag or the like, and other shelving 41 for toilet articles, etc. and provided with mirrors 8. In the ceiling 7 above the anteroom 35 is an opening 46, closed by any suitable type of door 49 to provide access to luggage compartment 42 extending substantially from body end wall 13 to inner transverse partition 43 and of sufficient height to accommodate luggage 44 too large or too heavy to be placed on the usual baggage racks 45 above the seats in the passenger compartment, to avoid overcrowding of the baggage racks and cluttering of the aisles. The luggage compartment 42 opens to chutes 27 extending transversely of the car and leading downwardly and outwardly toward discharge openings 47 in the car sides to permit loading and unloading of the luggage from outside the car to prevent congestion at the vestibule. The chute openings are closed by doors 48 preferably slidably mounted in the car walls 11, and arranged to be locked and released by mechanism 53 of any approved type operable from the inside of the car. The dressing rooms 25 of each group are separated from each other by partitions 9 arranged transversely of the car and extending from adjacent side wall 11 to respective housing longitudinal wall 29, as best shown in Figs. 1 and 2. At the non-vestibule end of the car the dressing rooms are positioned between the housing end wall 50 at the seating compartment 24 and the end partition 51 adjacent the body end wall 19. The end partition is spaced from the end wall to provide a conduit 52 for air conditioning pipes 54, to which access may be had through appropriate covered openings in said partition, but not shown. These pipes connect the condenser and compressor equipment underneath the car with the air conditioning evaporator and circulating equipment 55 in the compartment above the ceiling 56 indicated in Fig. 4.

Between the dressing and anterooms arranged at opposite ends of the car as described, is disposed the passenger occupancy section 24 fitted with a plurality of rows of seats upon opposite sides of a central longitudinal aisle 6 connecting the side passageways 16 and 21 at opposite ends of the car, as best shown in Figs. 1 and 2. At the side wall position 11 at the passageway 16 on opposite sides of window 4 may be installed the supply lockers 60 and 61, and a drinking fountain 62 may be positioned adjacent the supply locker 61, as shown in Fig. 1, behind partition 63 separating the passageway 16 from the seating section 24 at the vestibule end of the car. Similarly, the passageway 21 at the non-vestibule end of the car is separated from the seating section 24 by the partition 64 extending inwardly from the opposite side wall of the car, and at this passageway may be installed a locker 65 for housing the power and light electric circuit panels on one side of the window 5 and a locker 66 on the opposite side of the window for pillows and like articles of equipment for use of the passengers during day and night travel. The seats 3 are of the adjustable type similar to that disclosed in Patent No. 2,481,943 of September 13, 1949, for Seat and Leg Rest Arrangement, to enable the occupant to select any of a number of positions desired, from a normal sitting position to an extended or recumbent position of the person. In the present embodiment, each seat occupant has available for his individual use, a foot and leg rest assembly 32 under the control of the passenger desiring to use it; the assembly as herein contemplated, is arranged to be folded into a recess in the back of the seat in front of the one occupied by the passanger, as described in the patent aforesaid, and may be used with the seat in normal sitting position as indicated at 67 in Figs. 3 and 5, or in extended reclining position as shown at 68 depicted in Figs. 3, 4 and 5. When in the operative position shown, the foot and leg rests 32 are held by struts 69 designed to drop automatically into supporting position at the floor of the car, as illustrated in Figs. 3, 4 and 5, to provide in combination with the seat, a comfortable chaise-lounge accommodation between adjacent seats of a row.

The inner row of seats 2 at the side wall position and the outer row of seats 3 at the aisle position are similarly equipped to provide individual chaise-lounge facilities controllable independently of each other and operable to facilitate access to either of them from the aisle. As best shown in Figs. 1 and 2, the foot and leg rest assembly 32 at each seat is of less width than the respective seats 2 and 3 so as to provide leg space 70 between companion assemblies, and space 71 between the assemblies at seats 2 and respectively adjacent side walls 11, sufficient to permit convenient utilization of the foot and leg rest assembly by the seat occupant. The seats 2 and 3 of each pair are spaced from adjacent seats fore and aft to provide ample standing room floor space 72 in front of each pair of seats to allow for the adjustment of the seat backs from their normal sitting position shown at 67 to the reclining position indicated at 68.

To insure a measure of privacy for the occupants of the several pairs of seats 2 and 3 disposed as described, movable curtains are provided to screen each space from the lights and sounds of the rest of the car. These curtains 80 are preferably hung from rods 81 pivotally supported on hinges 82 secured to adjacent car wall 11, as best shown in Figs. 1, 3, 4, and 5, depicting the curtains in extended operative position between the seats, and adapted to be swung out of the way against the side walls 11 to serve as drapes 83 at respective side windows 57, as shown in Figs. 1 through 4, when not required for use by occupants of the section. As indicated in Figs. 3 and 4, the curtains 80 are divided at the center so that one portion thereof may be shifted to a position adjacent the pivoted end of the curtain rod 81 and the other portion gathered at the other and free end of the curtain rod, in which position of the curtains the rod is releasably held secured by any suitable means or support 58 on the wall or rod to prevent displacement of the rod. Similar retaining means may be used to hold the rod 81 and curtains 80 in screening position between the seats as shown in Figs. 5 and 6; in the embodiment shown, an intermediate portion of the curtain rod is fitted with a clip 84 pivoted on the rod 85 and preferably of channel shape to nest over the rod 81 when not in use to permit the rod and curtain to be moved to the wall; the baggage rack or structure 45 is provided with retaining brackets 86 secured at the outer edge portion of the rack at each curtain rod position and also of channel shape, as shown in Fig. 6. The brackets are formed with an attaching web portion 87 and with spaced outwardly extending flanges 88 to receive the rod clip 84, the brackets and clips being proportioned to support the respective rods 81 and the weight of the curtains 80 mounted thereon and prevent side sway of both during train movement. The brackets may be provided with a stud piece 89 projecting outwardly from the web 87 intermediate the flanges 88 and fitted with a wing nut 90 disposed to register with an opening 91 in the clip 84 to allow the clip to enter between the bracket flanges, whereupon the nut may be turned to lock the clip 84 in rod supporting position to prevent disengagement, as best shown in Fig. 6.

To hold together the drape portions 83 when they are being used as curtains 80 to screen the seat sections, they are provided along their meeting edges with releasable fastening means 59 designed to connect the two parts together as a unit. For securing the curtains thus connected to the occupied section seats 2 and 3 and to the seats in front of the seat sections to be screened, the lower edges of the curtains 80 are likewise adapted to be fastened to the seats at points adjacent the upper side of the seat backs in such fashion as to prevent any possible intrusion upon the privacy of a seat section by the occupants of an adjoining section.

Additional privacy may be afforded the individual occupants of a seat section by the application of screening panels 73 movably mounted in the space 74 between the seat backs, as shown in Fig. 5, in accordance with construction disclosed in Patent No. 2,505,687 of April 25, 1950, for Shield and Seat Arrangement, to obtain virtual compartmentation of the seat sections when utilized in connection with the curtains 80. The panels lie normally in the transverse projection of the seat backs when the seat backs are disposed in the normal sitting position shown at 67, but when the seat backs are lowered to a reclining position as shown at 68, the panels 73 will project forwardly of the seat backs to serve as a partition substantially head high between the occupants of a section and providing thereby the comfort and safety of a separate compartment. The panels 73 are retractible manually to a position between the seat backs when in reclining position but are returned automatically when seat backs are restored to normal sitting position. To provide against possible encroachment upon the seat space of companion occupant, the seats of each section may be fitted with arm rests 75 positioned between the seats 2 and 3 and intermediate the section end arm rests 76 and 77 at the side wall and aisle positions, respectively, as shown in Figs. 1 and 2. The windows 57 are provided with curtains 78, preferably in the form of Venetian blinds, as shown in Figs. 3, 4 and 5, to supplement the curtains 80 to exclude outside light from the section, and may be drawn as shown at the right in Fig. 3 and at the left in Fig. 4 during night travel or for use in daytime when occupants desire relaxation or repose. The blinds may be used in the raised position shown at the left in Fig. 3 and at the right in Fig. 4 supplemented by the drapes 83 when not functioning as curtains 80 between the seat sections.

In the embodiment shown, the seats are arranged to face the vestibule end of the car and, in this position, the front seats of those on one side of the aisle 6 will face partition 63 separating the seat compartment 24 from the passageway 16 leading to the vestibule. To accommodate the foot and leg rest assembly 32 in the standing room space 72 between the seats and partition 63 and to enable the seat occupants to fold the foot and leg rest out of the way when not desired, the partition 63 is provided with a recess 79; the assembly 32 for the standing room space 72 between the front seats at the opposite side of the aisle and the adjacent housing end wall 30 may be folded out of the way within a recess 31 formed in the wall to receive the foot and leg rest assembly, all as shown in Figs. 1, 12 and 13. The recesses 31 and 79 in the housing end wall 30 and partition 63, respectively, for receiving the respectively adjacent assemblies 32 mounted thereon, are in conformity with the general scheme providing recessed seat backs to afford extra leg room between the seats without decreasing the seating capacity of the car. The seats 2 and 3 may also be fitted with foot rails 92 adjacent the floor for use of the occupants of the sections to the rear of the seats, when the foot and leg rest assembly is not being used. Similar rails may also be installed at partition 63 and housing end wall 30 in addition to the foot and leg rest assembly there used.

For the convenience of the individual occupants of a section, suitable lighting facilities are provided with fixtures adapted for the exclusive use and control by individual occupants. For the purpose of this assembly, certain of the lighting fixtures in the present embodiment form preferably a part of the baggage rack installation 45 and may be of any approved type. As shown in Figs. 3, 4 and 5, the racks have a series of lighting fixtures 93 adjacent the outer edges of the racks and fitted each with a lens 94 arranged to direct a beam of light restricted to the reading plane for occupant of aisle seat 3 and controllable by him from switch 95 at the side wall. Similarly, the occupant of seat 2 at the side wall is furnished with light from fixture 96 having a lens 97 adjusted to direct a beam restricted to the reading plane for the occupant of said seat and controllable by him from switch 98 also on the side wall fixture 96. Obviously the fixtures 93 and 96 may both be carried by the baggage rack 45 and so disposed as to be accessible to the occupants of the individual aisle and side wall seats 3 and 2, respectively.

The coach above described will provide comforts heretofore found only in Pullman cars and furnish accommodations for passengers for daytime or night travel having the comfort and safety of compartmental installations. The space between seats is sufficiently ample to provide necessary leg room and utilize to best advantage the full length windows at each seat section, and permit the seats to assume a reclining position for complete relaxation of the person and somewhat greater than that obtaining in existing standard coach installations, without the sacrifice of available passenger space. The arrangement provided for screening the occupants of a section from those of adjoining sections and employing curtains extending transversely of the car between the seats when privacy is desired, and shiftable to a position at the windows to function as drapes therefor when not so used, is especially desirable in connection with the partitions 73 between the seat backs to screen the occupants of companion seats. These features combine to provide compartment characteristics to the section to contribute safety and comfort to the individual seat occupants.

What is claimed is:

1. A vehicle having a longitudinal aisle, rows of seats upon opposite sides of said aisle, curtain means for dividing said seats into sections, each of said sections being arranged to contain a seat of each said rows of seats, and full windows in the side walls of the vehicle individual to the seats of respectively adjacent sections, said curtain means comprising a rod positioned above the seats and having one end pivotally connected to the respective side wall and curtains mounted on the rod and the curtains being adapted to be moved from their respective section forming positions between the seats to serve as drapes at the respective section window positions.

2. In a vehicle having a longitudinal aisle, rows of seats upon opposite sides of said aisle, curtain means for dividing said seats into sections, each of said sections being arranged to contain a seat of each said rows of seats, full windows in the side walls of the vehicle individual to the seats of respectively adjacent sections, said curtain means comprising a rod positioned above the seats and having one end pivotally connected to the respective side wall and curtains mounted on the rod and the curtains being adapted to be moved from ther respective section forming positions between the seats to serve as drapes at the respective section window positions, baggage racks overlying said sections, and means on said racks releasably engaging and partly supporting said curtain means in section forming position.

3. A vehicle having a longitudinal aisle, rows of seats upon opposite sides of said aisle, curtain means for dividing said seats into sections, each of said sections being arranged to contain a seat of each said rows of seats, full windows in the side walls of the vehicle individual to the seats of respectively adjacent sections, said curtain means comprising each a curtain supporting rod pivotally mounted at the side wall position at one side of each window and movable to its respective section forming position between the seats, baggage racks above said windows and overlying said sections, supporting clips pivotally secured to said rod intermediate its ends, and curtains on said rod upon opposite sides of said clip adapted each to be shifted away from the other to serve as drapes at the window position when moved to the side wall, and supporting and locking means on said racks for engaging adjacent curtain rod clips.

4. In a vehicle having side walls and a longitudial aisle, rows of seats upon opposite sides of said aisle, curtain means for dividing said seats into sections comprising a rod pivotally connected to the respective side wall and curtains mounted on the rod, baggage racks overlying said sections, and means on said baggage racks releasably engaging and partly supporting said curtain means in section forming position, the curtains being adapted to be moved from their respective section forming positions between the seats to a position against the respective side walls.

5. In a vehicle having side walls and a longitudinal aisle, rows of seats upon opposite sides of said aisle, curtain means for dividing said seats into sections, each of said sections being arranged to contain a seat of each said rows of seats to provide individual occupancy spaces transversely of the vehicle, said curtain means comprising a rod pivotally connected to the respective side wall and curtains mounted on the rod, and baggage racks overlying said sections having means for releasably engaging and partly supporting said curtain means in section forming position, the curtains being adapted to be moved from their respecive section forming positions between the seats to a position against the respective side wall.

6. In a vehicle having a side wall, a pair of seats arranged one in front of the other along the side wall, a rod positioned above the seats and having one end pivotally connected to the side wall, and a curtain mounted on the rod, the rod and the curtain being adapted to extend between the seats in one position and being swingable to another position against the side wall.

7. In a vehicle having a body having a side wall, a pair of seats arranged one in front of the other along the side wall, a rod positioned above the seats and having one end pivotally connected to the side wall, a curtain mounted on the rod, the rod and the curtain being adapted to extend between the seats in one position and being swingable to a position against the side wall, means extending from the body and connected to the rod to partly support the rod in the first-named position, and means secured to the side wall and engageable with the rod to partly support the rod in the second-named position.

8. In a vehicle having a side wall, a pair of seats arranged one in front of the other along the side wall and longitudinally of the vehicle, a structure extending from the side wall and spaced above the seats, a rod positioned below the structure and above the seats and having one end pivotally connected to the side wall, a curtain mounted on the rod, a clip having one end pivotally connected to the rod intermediate the ends thereof, a bracket positioned against the structure adjacent said one end of the rod and secured to the structure, and a support positioned below the structure and secured to the side wall, the rod and the curtain being adapted to extend between the seats in which position the other end of the clip is releasably secured to the bracket and the rod and curtain being swingable to a position against the side wall in which position the other end of the rod engages the support.

References Cited in the file of this patent

UNITED STATES PATENTS

| 363,891 | Goeolet | May 31, 1897 |
| 1,008,685 | Wildman | Nov. 14, 1905 |
| 1,073,938 | Sobocienski | Sept. 23, 1913 |
| 1,147,944 | Holdensen | July 27, 1915 |
| 2,192,882 | De Muth | Mar. 12, 1940 |
| 2,400,462 | Ledwinka et al. | May 14, 1946 |